No. 722,916. PATENTED MAR. 17, 1903.
G. J. SCOTT.
MOTOR VEHICLE.
APPLICATION FILED MAY 16, 1902.
NO MODEL. 3 SHEETS—SHEET 1.
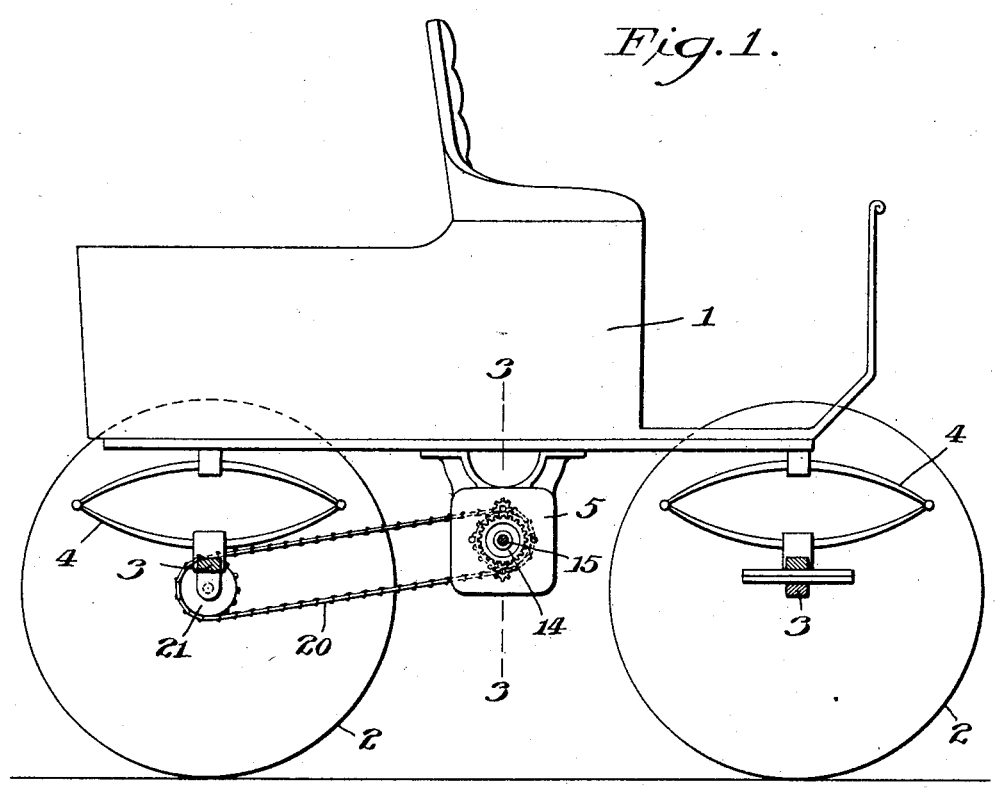
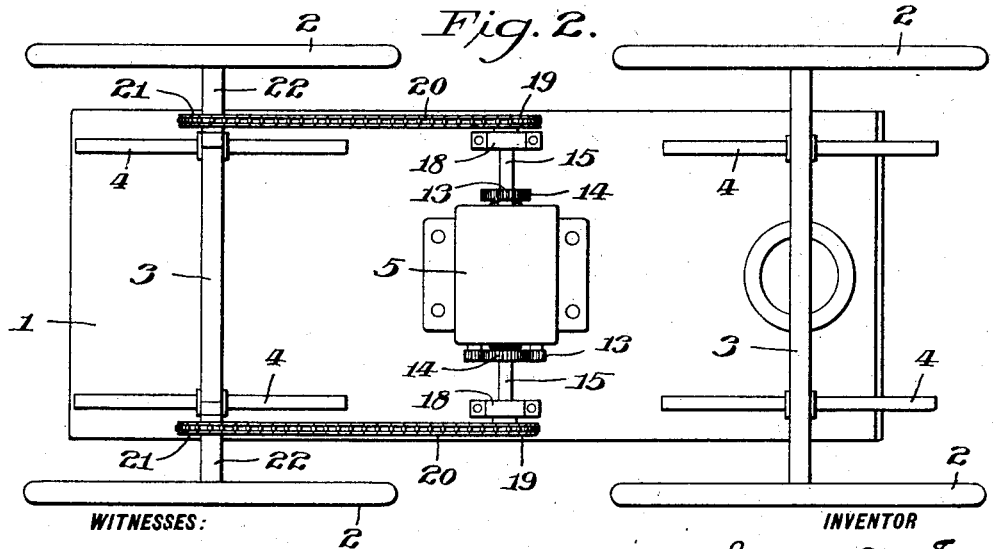
WITNESSES:
R. H. Gamble
H. W. Canby
INVENTOR
Gordon J. Scott
BY
A. V. Groupe
ATTORNEY.
THE NORRIS PETERS CO., PHOTO-LITHO., WASHINGTON, D. C.

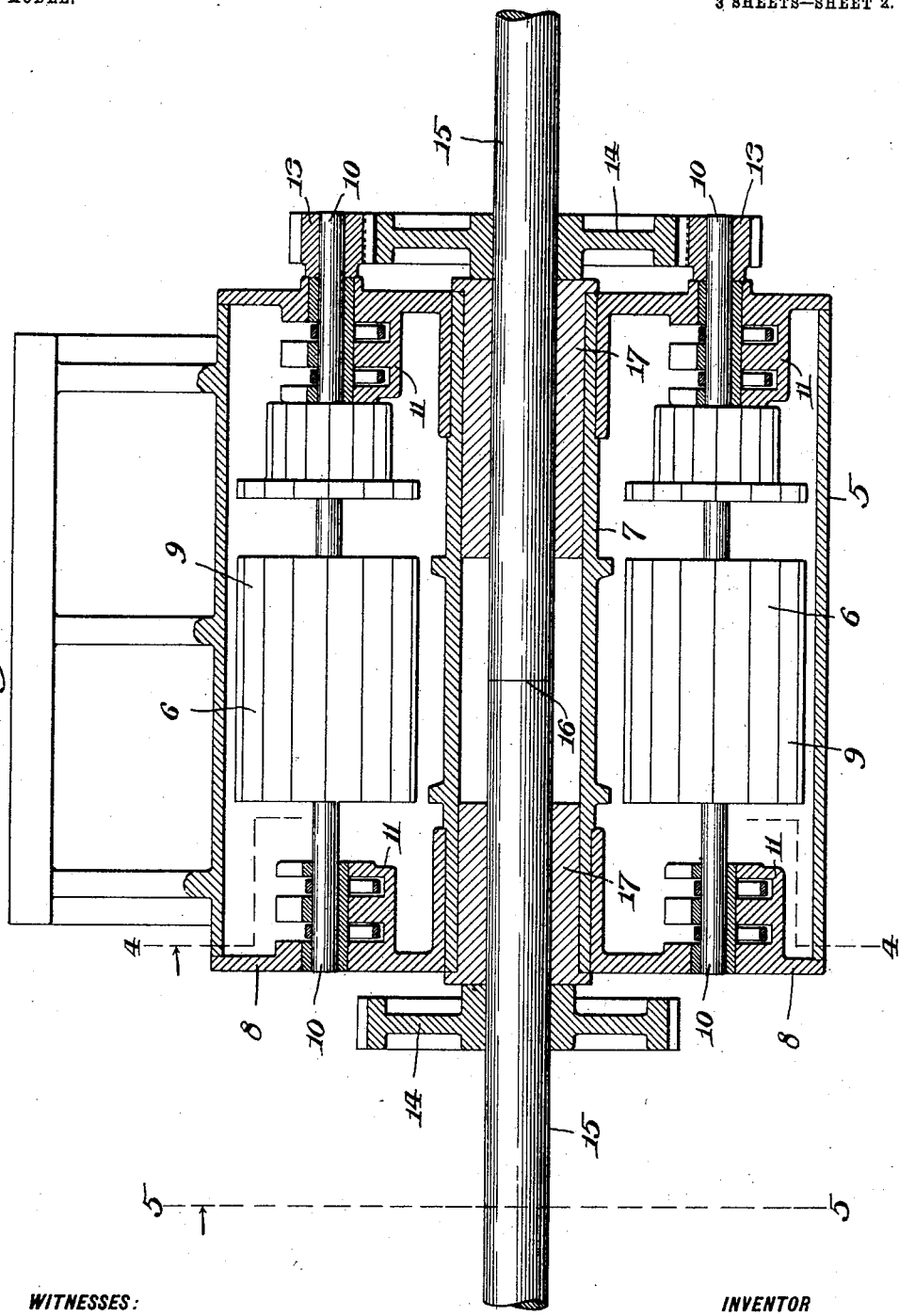

No. 722,916. PATENTED MAR. 17, 1903.
G. J. SCOTT.
MOTOR VEHICLE.
APPLICATION FILED MAY 16, 1902.
NO MODEL. 3 SHEETS—SHEET 3.
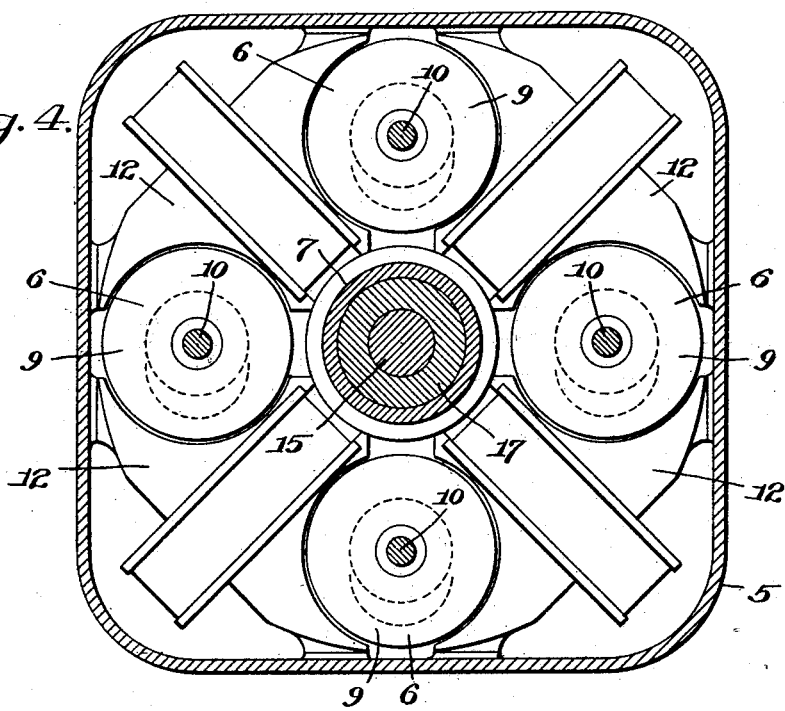
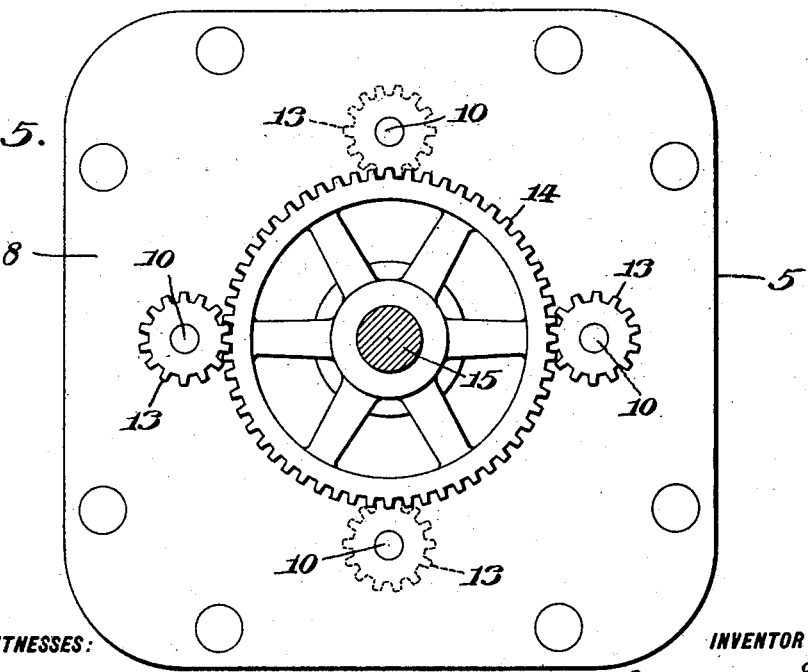
WITNESSES: INVENTOR
R. H. Gamble Gordon J. Scott
W. H. Canby BY A. V. Groupe
ATTORNEY.

UNITED STATES PATENT OFFICE.

GORDON J. SCOTT, OF PHILADELPHIA, PENNSYLVANIA, ASSIGNOR TO CHARLES H. GRAHAM AND GEORGE D. BOUTON, OF PHILADELPHIA, PENNSYLVANIA.

MOTOR-VEHICLE.

SPECIFICATION forming part of Letters Patent No. 722,916, dated March 17, 1903.

Application filed May 16, 1902. Serial No. 107,572. (No model.)

*To all whom it may concern:*

Be it known that I, GORDON J. SCOTT, a citizen of the United States, residing at Philadelphia, in the county of Philadelphia and State of Pennsylvania, have invented certain new and useful Improvements in Motor-Vehicles, of which the following is a specification.

This invention relates to motor-vehicles, and has for its object to provide a simple and efficient driving mechanism of compact construction whereby the carrying-wheels of the vehicle on the opposite sides thereof may be driven, so as to compensate or differentiate for the variation in speed of the respective carrying-wheels when in turning the vehicle said wheels travel curves of different radii.

With this object in view my invention comprises various novel features of construction and combinations of parts, which will be hereinafter fully described and claimed.

In the drawings, Figure 1 is a side elevation, partly in section, of a vehicle equipped with my invention. Fig. 2 is a bottom view thereof. Fig. 3 is a vertical section as on the line 3 3 of Fig. 1. Fig. 4 is a vertical section as on the line 4 4 of Fig. 3. Fig. 5 is a vertical section as on the line 5 5 of Fig. 3.

1 designates the body of a vehicle, 2 the carrying-wheels therefor, and 3 the axles, the body being supported on the axles by springs 4 in the usual manner. The carrying-wheels 2 are mounted on the axles 3, as usual, so as to be rotatable at relatively different speeds in turning curves, &c.

5 is a casing in which are arranged a series of motors, which may be of any suitable construction and driven by any suitable power. In the present embodiment of my invention the casing contains four electric motors 6, the same being arranged around a [centrally-disposed sleeve 7, which is supported by the end heads 8 of the casing 5. The armatures 9 of the motors 6 are mounted on shafts 10, which are fitted to bearings 11 in the end heads 8, and the field-magnets 12 are supported between the sleeve 7 and casing 5 and are so arranged as to form a magnetic circuit common to all the armatures around the sleeve 7. Two of the shafts 10 extend outwardly beyond one end of the casing, and the other two shafts 10 extend outwardly beyond the opposite end of said casing, as shown. The outwardly-extending ends of these shafts are provided with pinions 13, which coact with spur-wheels 14, affixed to the respective sections of a two-part shaft 15, extending through the sleeve 7. This shaft 15 is parted, as at 16, about midway of its ends and is fitted to bearings 17 in the sleeve 7 and also to bearings 18, depending from the body of the vehicle. The respective ends of the shaft 15 extend outwardly and are provided with sprocket-wheels 19, which are connected by chains 20 with sprocket-wheels 21, affixed to the hubs 22 of the two rear carrying-wheels 2, respectively.

By the above-described construction it will be seen that the motors 6, having a common casing or support, constitute a motor having a series of independent driving members, half of which are connected so as to drive the rear carrying-wheel on one side of the vehicle, the other half being connected so as to drive the rear carrying-wheel on the opposite side of the vehicle. This construction permits the two driven carrying-wheels to roll at exactly the speed necessary in turning curves of different radii without one of said wheels slipping to accommodate the other or in any way acting to waste the power.

I claim—

1. In a motor-vehicle, the combination with the carrying-wheels, of an electric motor having a plurality of armatures arranged in a circle at right angles to the axes of rotation of said armatures, field-magnets forming a magnetic circuit common to the plurality of armatures, and gearing between said armatures and carrying-wheels.

2. In a motor-vehicle, the combination with the carrying-wheels, of a casing provided with end heads, a plurality of parallel shafts extending through said casing and journaled in said end heads, means for independently rotating said shafts, and gearing between said shafts and carrying-wheels.

3. In a motor-vehicle, the combination with the carrying-wheels, of a casing provided with end heads, gear-wheels journaled in said end heads, a plurality of shafts extending through said casing and journaled in said end heads, means for independently rotating said shafts, gearing between said shafts and gear-wheels, and gearing between said gear-wheels and the carrying-wheels.

4. In a motor-vehicle, the combination with the carrying-wheels, of a casing or support carried by said vehicle, a two-part shaft extending through said casing or support, a plurality of driving members mounted on said casing or support and arranged around said shaft, means for actuating said members, gearing between said shaft and members, and gearing between said shaft and carrying-wheels.

In testimony whereof I affix my signature in presence of two witnesses.

GORDON J. SCOTT.

Witnesses:
ANDREW V. GROUPE,
RALPH H. GAMBLE.